United States Patent
Luo et al.

(10) Patent No.: US 11,694,460 B1
(45) Date of Patent: Jul. 4, 2023

(54) NATURAL LANGUAGE PROCESSING AND TEXT ANALYTICS FOR AUDIT TESTING WITH DOCUMENTATION PRIORITIZATION AND SELECTION

(71) Applicant: Wells Fargo Bank, N.A., San Francisco, CA (US)

(72) Inventors: Qun Luo, San Francisco, CA (US); Andrew Mack, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 140 days.

(21) Appl. No.: 17/140,867

(22) Filed: Jan. 4, 2021

(51) Int. Cl.
| | |
|---|---|
| *G06N 3/04* | (2023.01) |
| *G06V 30/414* | (2022.01) |
| *G06F 40/216* | (2020.01) |
| *G06F 40/258* | (2020.01) |
| *G06V 30/416* | (2022.01) |
| *G06F 40/284* | (2020.01) |
| *G06F 18/2411* | (2023.01) |
| *G06N 3/09* | (2023.01) |

(52) U.S. Cl.
CPC ........ *G06V 30/414* (2022.01); *G06F 18/2411* (2023.01); *G06F 40/216* (2020.01); *G06F 40/258* (2020.01); *G06F 40/284* (2020.01); *G06N 3/04* (2013.01); *G06N 3/09* (2023.01); *G06V 30/416* (2022.01)

(58) Field of Classification Search
CPC .... G06F 40/216; G06F 40/258; G06F 40/284; G06F 40/00; G06N 3/00
See application file for complete search history.

(56) References Cited

U.S. PATENT DOCUMENTS

2005/0021517 A1* 1/2005 Marchisio ............. G06F 16/954

OTHER PUBLICATIONS

"Improving Document Ranking with Dual Word Embeddings" by Nalisnick et al, dated from WWW'16 Companion, Apr. 11-15, 2016, Montréal, Québec, Canada. ACM 978-1-4503-4144-8/16/04. DOI: http://dx.doi.org/10.1145/2872518.2889361 (Year: 2016).*

* cited by examiner

*Primary Examiner* — Sanchita Roy
(74) *Attorney, Agent, or Firm* — Foley & Lardner LLP

(57) ABSTRACT

Disclosed are systems, methods, and computer readable media for natural language processing and text analytics of audit documentation for prioritization and selection. Text extraction and conversion techniques can analyze documents corresponding to an audit request to generate a dataset. A two-layer model can produce word embeddings to reconstruct linguistic contexts of words in the dataset. An embedding layer can map each word, and a classifier layer can generate a similarity score for each word. A three-layer model can determine weights of documents in the dataset. A ranking layer can obtain a document rank value for each document. An initial layer and successive layers can receive feature vectors and document rank values to assign weights to the documents. Based on the document weights and the audit request, the natural language processing and text analytics can determine an audit likelihood for each document to prioritize and select subsets of the documents.

20 Claims, 9 Drawing Sheets

NATURAL LANGUAGE PROCESSING AND TEXT ANALYTICS FOR AUDIT TESTING WITH DOCUMENTATION PRIORITIZATION AND SELECTION

TECHNICAL FIELD

Embodiments of the present disclosure relates to natural language processing and text analytics of datasets having varying fields and field types, formats, and/or content for prioritization and selection of subsets of documents.

BACKGROUND

Institutions can receive documents relating to transactions, user feedback, or regulatory filings. The documents may relate to various topics and be received from a variety of enterprises. The institution may attempt to review and analyze the documents, but doing so may be difficult or time consuming.

SUMMARY

Various embodiments relate to systems, methods, and computer readable media for natural language processing and text analytics of audit documentation for prioritization and selection. The system may include a memory having computer-executable instructions and one or more processors configured to execute instructions. The one or more processors can receive a plurality of documents corresponding to an audit request. The plurality of documents can include a first set of one or more documents of a first file type and a second set of one or more documents of a second file type. The one or more processors can apply a plurality of text extraction and conversion techniques to the first and second sets of documents to generate a plurality of machine-readable documents. The one or more processors can generate a dataset comprising the plurality of machine-readable documents and labels assigned to a subset of the plurality of machine-readable documents. Each label can be associated with at least one of a plurality of classifications corresponding to the audit request. The one or more processors can establish, using the dataset, a first model to produce word embeddings to reconstruct linguistic contexts of words in the machine-readable documents. The first model can include an embedding layer configured to map each word of a first plurality of words in the subset that are associated with a predetermined audit word to generate a first plurality of feature vectors for each word in the first plurality of words in the subset. The first model can also include a classifier layer configured to generate, from the first plurality of feature vectors, a similarity score for each word in the first plurality of words in the subset. Each similarity score can indicate a similarity of each word with the predetermined audit word. The one or more processors can apply the first model to the dataset to generate a second plurality of feature vectors for a second plurality of words in the plurality of machine-readable documents. The one or more processors can establish a second model to determine document weights of each machine-readable document. The second model can include a ranking layer configured to obtain a document rank value for each of the plurality of machine-readable documents. The document rank value can be based on a number of semantic links between pairs of the plurality of machine-readable documents. The second model can include an initial layer configured to receive the second plurality of feature vectors for each of the second plurality of words in the plurality of machine-readable documents and their corresponding document rank values to assign a first-stage document weight to each machine-readable document. The second model can include one or more successive layers configured to receive (i) the first-stage document weight and (ii) a subsequent feature vector for each subsequent word within each machine-readable document and its corresponding first-stage document weight to assign a second-stage document weight to each machine-readable document. The one or more processors can apply the second model to the second plurality of feature vectors of each word in each machine-readable document and their corresponding document rank values to assign a third-stage document weight to each machine-readable document. The one or more processors can determine, based on the third-stage document weights and the audit request, an importance score indicating an audit likelihood for each of the plurality of documents.

In some embodiments, the plurality of documents are images or word processing documents. In some embodiments, the pluralities of documents are word processing documents, and wherein the pluralities of text extraction and conversion techniques include python-based extraction. In some embodiments, the pluralities of documents are images, and wherein the pluralities of text extraction and conversion techniques include pyPdf, textract, and natural language toolkit. In some embodiments, the plurality of text extraction and conversion techniques extract section headers, document headers, users, titles, and/or timestamps from the plurality of documents. In some embodiments, the one or more processors are further configured to apply the first model and the second model to the section headers, document headers, users, titles, and/or timestamps to modify the importance score. In some embodiments, the plurality of documents include a set of model documents, templates, policies, whitepapers, model develop documents (MDD), model validation reports (MVD), or performance reports. In some embodiments, the one or more processors are further configured to receive the plurality of documents corresponding to an audit request from a first provider device. The one or more processors can receive, via an API, the predetermined audit word from a second provider device (of, e.g., a government entity or regulator). In some embodiments, the one or more processors are further configured to indicate, using the first model, a frequency of each word of the second plurality of words. In some embodiments, the document rank value is based on the number and type of semantic links between pairs of the plurality of machine-readable documents. The type of semantic link can correspond to the labels assigned to the subset of the plurality of machine-readable documents. In some embodiments, the first-stage document weight is based on a total number of the plurality of documents, an audit score associated with the audit request, or a matter requires attention (MRA) flag. In some embodiments, the second model includes a recurrent neural network (RNN), XGBoost, a support vector machine, and/or a convolution neural network (CNN). In some embodiments, the predetermined audit word is based on the audit request. In some embodiments, the one or more processors are further configured to select the plurality of documents corresponding to the audit request. The one or more processors can select the plurality of documents by selecting a first attribute based on an information gain, gain ratio, or Gini index. The one or more processors can select the plurality of documents by a second attribute associated with the first attribute and based on the information gain, the gain ratio, or the Gini index. The one or more processors can select the plurality of documents based on a characteristic of the second attribute and responsive to the second attribute satisfying a predetermined purity threshold. In some embodiments, the first model is a natural language processing algorithm. In some embodiments, the similarity score is based on a cosine similarity between a pair of feature vectors output by the embedding layer. In some embodiments, the second model is a recurrent neural network forming a directed graph between the second pluralities of words. In some embodiments, the second pluralities of words are connected as bi-grams or tri-grams. In some embodiments, the one or more processors are further configured to present, in a graphical user interface, the plurality of documents by importance score.

These and other features, together with the organization and manner of operation thereof, will become apparent from the following detailed description and the accompanying drawings.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1A:
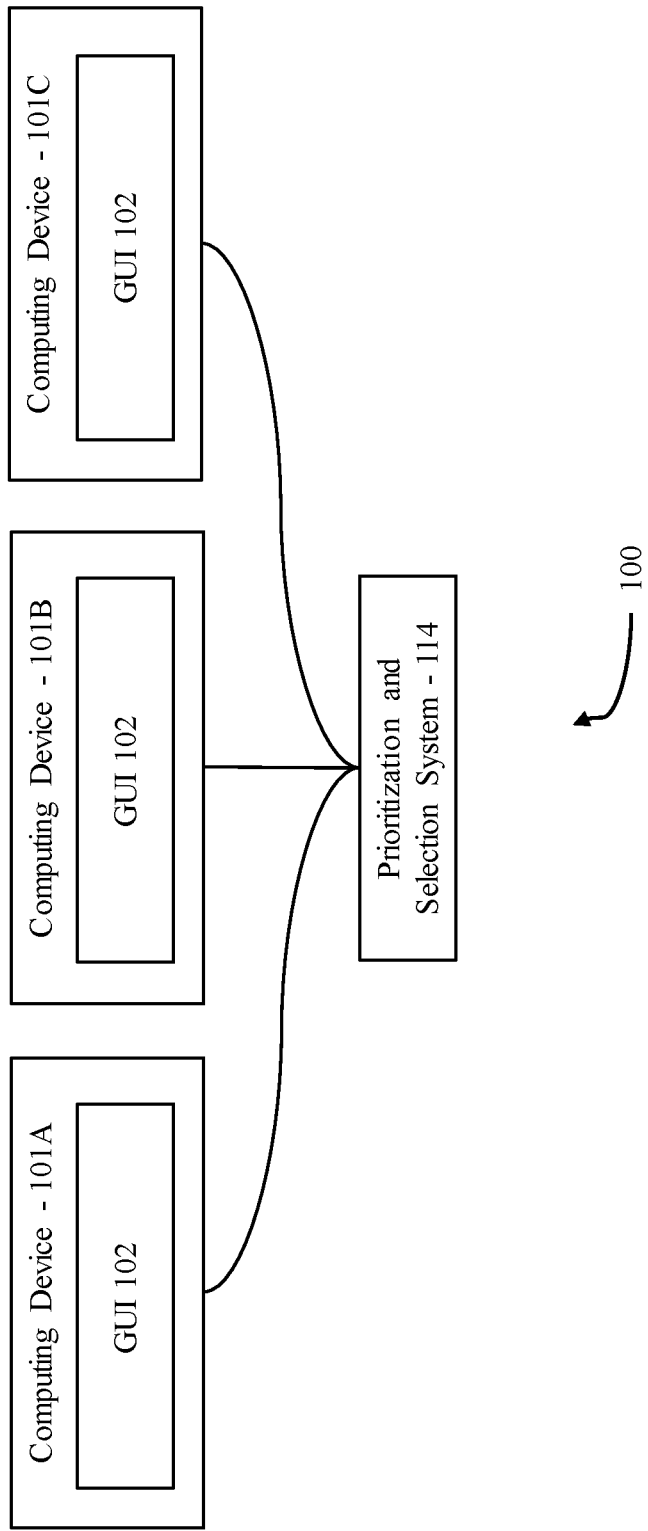
FIG. 1A is a block diagram of an example system for natural language processing and text analytics of audit documentation for prioritization and selection, according to various potential embodiments.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

Referring to the figures generally, systems, methods, and computer readable media for natural language processing and text analytics of audit documentation for prioritization and selection are disclosed. Text extraction and conversion techniques can be applied to analyze documents corresponding to an audit request to generate a dataset. A two-layer model can produce word embeddings to reconstruct linguistic contexts of words in the dataset. An embedding layer can map each word, and a classifier layer can generate a similarity score for each word. A three-layer model can determine weights of documents in the dataset. A ranking layer can obtain a document rank value for each document. An initial layer and successive layers can receive feature vectors and document rank values to assign weights to the documents. Based on the document weights and the audit request, the natural language processing and text analytics can determine an audit likelihood for each document to prioritize and select the documents. Accordingly, an institution can use the determined audit likelihood to allocate resources for the review of prioritized documents.

Referring to FIG. 1A, depicted is a block diagram of an example system 100 for natural language processing and text analytics of audit documentation for prioritization and selection is shown according to various potential example embodiments. System 100 may include a multiple computing devices 101 of one or more users and/or of one or more providers in one or more locations and a prioritization and selection system 104 (which may include one or more computing devices of a service provider in one or more locations). The computing devices 101 may include a graphical user interface (GUI) 102, one or more processors, memory, and a network interface (not pictured). The system 104 can identify and prioritize documents relating to audit documentation for prioritization and selection, such as a standard audit program (SAP) and quantitative targeted review (QTR). Accordingly, the system 104 can use decision trees, Natural Language Processing (NLP), and other models to analyze documents. In particular, the system 104 can determine which documents are generic messages in a normal course of communications, and which documents to select for review for a specific topic associated with an audit request. The system 104 can then prioritize documents to be reviewed based on a rank ordering of their importance, reduce the number of documents that needs to be reviewed unless a rule or audit is triggered, select relevant documents that might otherwise have been ignored, and prioritize documents by rank such as by ordering them by importance.

Figure 1B:
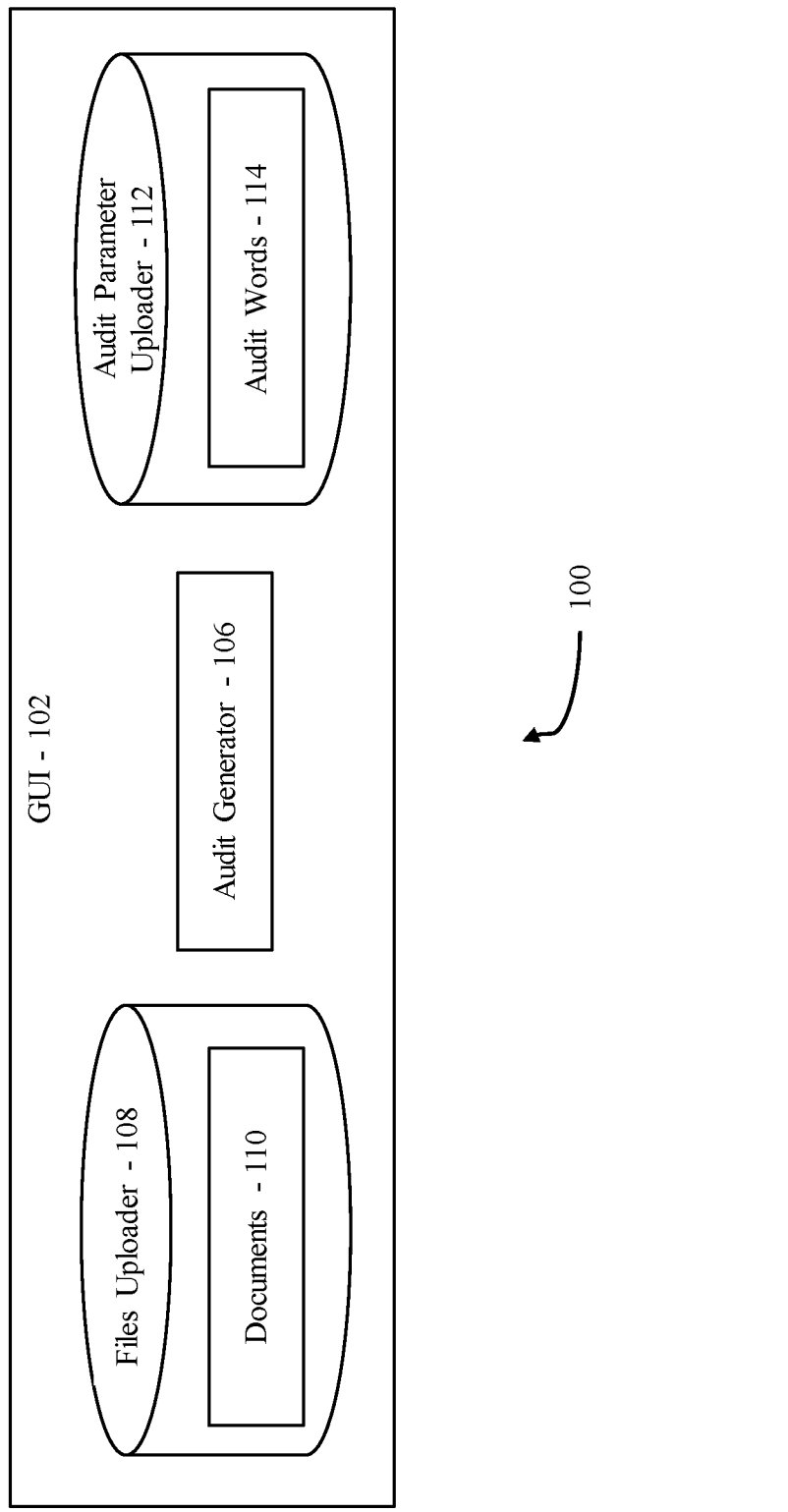
FIG. 1B is a block diagram of a GUI of an example system for natural language processing and text analytics of audit documentation for prioritization and selection, according to various potential embodiments.

Referring now to FIG. 1B, depicted is a block diagram of the GUI 102 of the system 100 for natural language processing and text analytics of audit documentation for prioritization and selection. The GUI 102 can present various interfaces for a user to interact, operate, or manage the prioritization and selection system 104. The GUI 102 can allow users to select or upload documents 110 for analysis by the prioritization and selection system 104. The GUI 102 can allow users to input or select parameters such as audit words 114 on which to base the analysis of the documents 110 by the prioritization and selection system 104. The GUI 102 can include an audit generator 106 for generating audit requests, a files uploader 108 for uploading documents to analyze, and an audit parameter uploader 112 for uploading parameters for an audit request. In some embodiments, the GUI 102 can present the interfaces to a client application (e.g., a graphical user interface on a user device) for generating audit requests by the audit generator 106 for analyzing documents 110 of the files uploader 106 based on audit words 114 of the audit parameter uploader 112. Responsive to the audit requests, the GUI 102 can receive, from the prioritization and selection system 104, a prioritization of the documents 110. Accordingly, the GUI 102 provides a variety of different tools and interfaces to monitor, audit, view, or analyze various files. For instance, users can quickly manage many files without resorting to time-consuming methods such as annotating, bookmarking, or excessively relying on subject matter experts. As such, the GUI 102 presents a one-stop shop for users to identify files relevant to their topic of interest.

The audit generator 106 can generate audit requests. The audit generator 106 can transmit instructions to the prioritization and selection system 104 based on the audit requests. In some embodiments, the audit generator 106 can transmit the audit requests, via execution of an API protocol comprising an API and corresponding specifications to generate API requests (API calls) according to the specifications, to the prioritization and selection system 104. The audit requests can include documents 110 and audit words 114.

The files uploader 108 can upload documents 110 for selection by the GUI 102 and analysis by the prioritization and selection system 104. The files uploader 108 can upload from RAM, ROM, NVRAM, Flash Memory, or hard disk storage for facilitating at least some of the various processes described herein, as well as one or more data repositories.

The documents 110 can relate to regulatory filings, transactions, liens, deeds, loans, or any other documents in various formats. In some embodiments, the documents 110 are in an image or word processing format. In some embodiments, the documents 110 include a set of model documents, templates, policies, whitepapers, model develop documents (MDD), model validation reports (MVD), or performance reports.

The audit parameter uploader 112 can upload audit parameters such as audit words 114 for selection by the GUI 102 and analysis by the prioritization and selection system 104. The audit parameter uploader 112 can upload from RAM, ROM, NVRAM, Flash Memory, or hard disk storage for facilitating at least some of the various processes described herein, as well as one or more data repositories.

The audit words 114 can relate to various topics of interest by a user to identify, prioritize, and select documents 110. For instance, the audit words 114 can relate to a geographic location, a transaction type, a business name, a business type, a regulatory agency, an account type, product inquiries, credit cards, mortgages, or an audit type.

Figure 1C:
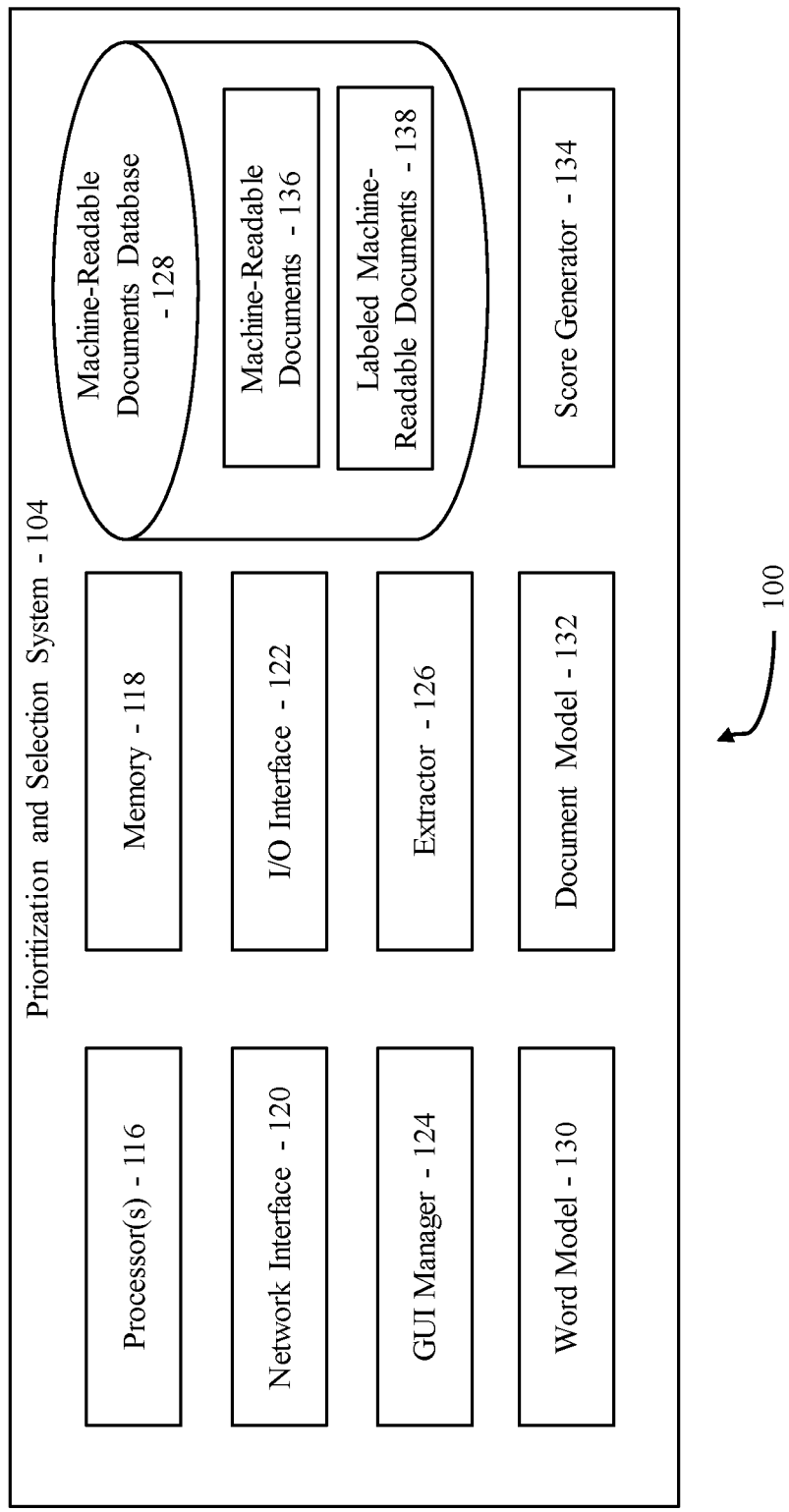
FIG. 1C is a block diagram of an example prioritization and selection system for natural language processing and text analytics of audit documentation for prioritization and selection, according to various potential embodiments.

Referring now to FIG. 1C, depicted is a block diagram of the prioritization and selection system 104 for applying natural language processing and text analytics to audit documentation for prioritization and selection. The prioritization and selection system 104 can interface with the GUI 102 to receive audit requests, and to determine prioritization of the documents 110 to present to the GUI 102. The prioritization and selection system 104 can include a processor 116, a network interface 120, an I/O interface 122, a GUI manager 124, an extractor 126, a machine-readable document database 128, a word model 130, a document model 132, and a score generator 134. The machine-readable document database 128 can include machine-readable documents 136 and labeled machine-readable documents 138.

The one or more processors 116 may be implemented as a general-purpose processor, an ASIC, one or more FPGAs, a DSP, a group of processing components, or other suitable electronic processing components structured to control the operation of the system 104.

The memory 118 (e.g., RAM, ROM, NVRAM, Flash Memory, hard disk storage) may store data and/or computer code for facilitating at least some of the various processes described herein, as well as one or more data repositories (which may include, e.g., database records such as user data, electronic activities, and acquired information). In this regard, the memory 118 may store programming logic that, when executed by the processor 116, control the operation of the prioritization and selection system 104. For instance, the memory 118 can have computer-executable instructions, such as python code, that the one or more processors 116 are configured to execute.

The network interface 120 may facilitate communications between the prioritization and selection system 104 and the GUI 102 over any of a variety of network protocols such as Ethernet, Bluetooth, or Wi-Fi.

The I/O interface 122 can allow the prioritization and selection system 104 to be configured by third party or an administrator. For instance, I/O interface 122 can include anything used to communicate with users such as input devices (e.g., keyboard, mouse, touchscreen, microphone for voice prompts, notification LEDs, buttons, switches, etc.) and output devices (e.g., display screens, speakers for sound emission, etc.) deemed suitable for operation of the prioritization and selection system 104. The administrator or third party can configure any of the functionalities of the prioritization and selection system 104 described herein. The I/O interface 122 can define the API for the receipt of the audit requests, documents 110, or audit words 114. The I/O interface 122 can define the interactions between the system 104 and the GUI 102. The I/O interface 122 can use the API to define calls or requests that the GUI 102 can make transmitting documents 110, the audit words 114, or the audit generator 106. The I/O interface 122 can also provide extension mechanisms for additional user devices or provider devices to contact the system 104. The I/O interface 122 can also customize the API for each provider device or user device. For example, the I/O interface 122 can define an API for a provider device to transmit documents 110 to the system 104, or define another API for a user device to transmit documents 110 and audit words 114 to the system 104.

The GUI manager 124 can present a plurality of virtual interfaces to manage, operate, and control the prioritization and selection system 104. The GUI manager 124 can present the virtual interfaces to the GUI 102.

Figure 2:
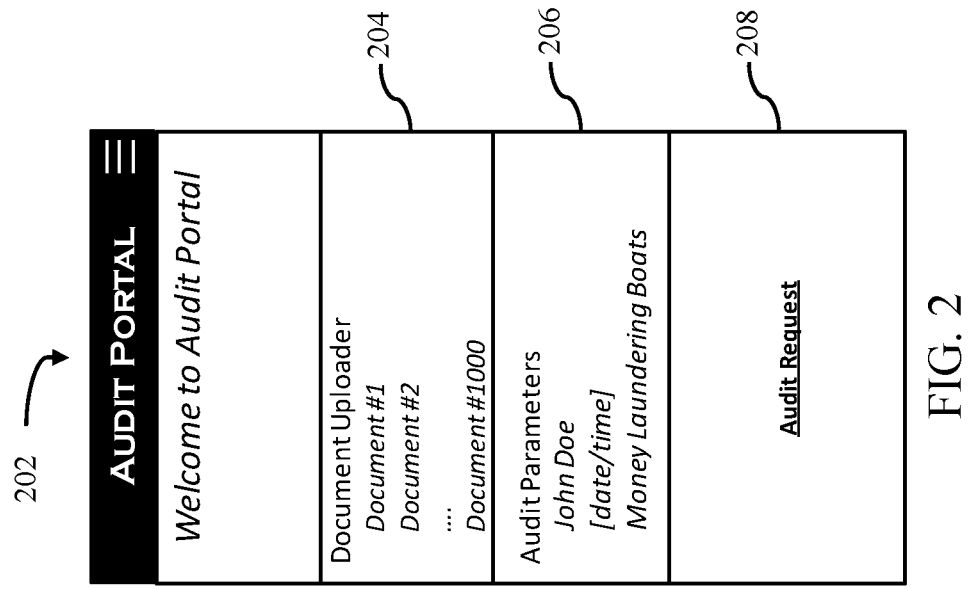
FIG. 2 provides an example view in an example audit portal for submitting an audit request, according to various potential embodiments, according to various potential embodiments.

Now referring to FIG. 2, depicted is an example audit view 202 in an example audit portal for submitting an audit request, according to various potential embodiments. The GUI manager 124 can present the audit view 202 of the audit portal in the GUI 102. The GUI manager 124 can receive documents 110 via the document uploader 204. The GUI manager 124 can receive other files from the files uploader 108. The GUI manager 124 can forward the received documents 110 to the extractor 126. The GUI manager 124 can receive audit parameters such as audit words 114, dates, times, names, authors, or topics. The GUI manager 124 can receive other audit parameters from the audit parameter uploader 112. The GUI manager 124 can forward the received audit words 114 to the word model 130, the document model 132, and/or the score generator 134. The audit view 202 can include an audit request 208 from the audit generator 106. The GUI manager 124 can request the prioritization and selection system 104 to analyze the documents 110 based on the audit word responsive to receiving a selection of the audit request 208.

Now referring back to FIG. 1, the extractor 126 can modify, monitor, or apply text extraction and conversion techniques to the documents 110. The extractor 126 can receive documents 110 corresponding to an audit request. In some embodiments, the extractor 126 can receive the plurality of documents 110 corresponding to an audit request from a first provider device such as via the GUI 102, and receive, via the API, the predetermined audit word 114 from a second provider device of an entity such as a governmental body or regulator.

The extractor 126 can receive documents 110 of a plurality of sets and of a plurality of file types, and the extractor 126 can apply the text extraction and conversion techniques to the documents 110 to extract, create, or generate machine-readable content. In some embodiments, the extractor 126 applies an optical character recognition algorithm or reader to the documents 110. In some embodiments, the extractor 126 applies text extraction and conversion techniques to the documents 110 based on the type or format of the documents 110. For instance, the extractor 126 can receive documents 110 in an image or word processing format. In some embodiments, the extractor 126 applies, to the documents 110 in the word processing format, extraction and conversion techniques such as pip install python-docx getText. In some embodiments, the extractor 126 applies, to the documents 110 in the image format, extraction and conversion techniques such as pyPdf, textract, and natural language toolkit. In some embodiments, the extractor 126 uses the text extraction and conversion techniques to extract section headers, document headers, users, titles, and/or timestamps from the documents 110. The extractor 126 can create or generate machine-readable documents 136 from the documents 110 by applying the text extraction and conversion techniques on the documents 110. The word model 130 can process or analyze the machine-readable documents 136. The extractor 126 can store the machine-readable documents 136 in the machine-readable document database 128. The extractor 126 can store sets of machine-readable documents 136 by topic or focus. By having audit specific sets of documents, each audit request can identify documents to review based on specific audit parameters or audit words 114. The extractor 126 can receive documents 110 with labels or labeled machine-readable documents 138. Each label can be associated with at least one of a plurality of classifications corresponding to the audit request. For instance, the labels can classify some documents as regulatory filings and other documents as deeds. The extractor 126 can receive the labels from subject matter experts. For instance, subject matter experts can be familiar with various types of audits or objectives, and thus indicate that documents are important or not important, or assign topical labels such as mortgage, deed, or business filing. The extractor 126 can assign the labels to the machine-readable documents 136 to generate labeled machine-readable documents 138. The labeled machine-readable documents 138 can be a subset of the machine-readable documents 136.

The machine-readable document database 128 can use RAM, ROM, NVRAM, Flash Memory, or hard disk storage to store data and/or computer code for facilitating at least some of the various processes described herein, as well as one or more data repositories.

Figure 3:
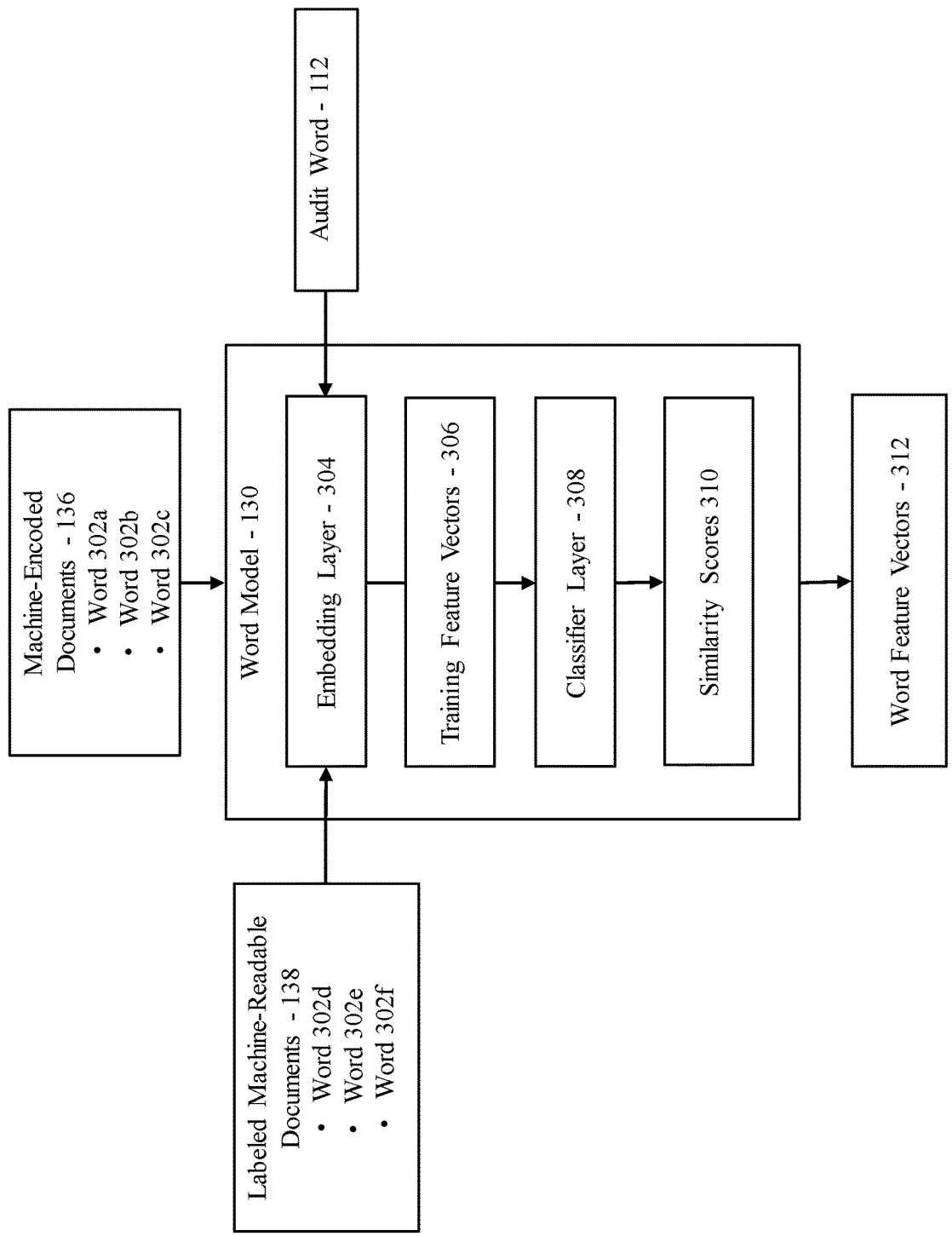
FIG. 3 is a block diagram of a word model in the system for natural language processing and text analytics of audit documentation for prioritization and selection, according to various potential embodiments.

Now referring to the FIG. 3, depicted is a block diagram of the word model 130 in the system 104 for natural language processing and text analytics of audit documentation for prioritization and selection. In some embodiments, the word model 130 includes a natural language processing algorithm. The word model 130 can interface with the machine-readable documents database 128. The word model 130 can produce word embeddings from the machine-readable documents 136 or the labeled machine-readable documents 138. In particular, the word model 130 can produce word embeddings such as feature vectors to reconstruct linguistic contexts of words. The word embedding skin indicates or represents words with similar meanings. In some embodiments, the word model 130 can produce word embeddings for the section headers, document headers, names, and titles of the documents 110. The word model 130 can receive words 302a-302f from the machine-readable documents 136 or the labeled machine-readable documents 138. The word model 130 can include an embedding layer 304 to produce feature vectors of words and the classifier layer 308 to analyze the feature vectors.

The word model 130 can train on the labeled machine-readable documents 138. The word model 130 can consider a plurality of labeled machine-readable documents 138 and attributes. The word model 130 can process a list of criteria or qualifiers to assess any of the labeled machine-readable documents 138. The word model 130 can utilize decision tree methodology to consider criteria or factors such as consent order, matter requires attention (MRA), documents risk ranking, documents assessment score, a number of model risk findings (MRFs), complexity methodology such as extraction from MDD or MVR. The word model 130 can select documents based on a linear combination of selections form the list of criteria or nodes defined based on an audit objective. For instance, the word model 130 can consider categorical variables (yes/no) or numerical values such as probabilities or other logics.

Accordingly, the word model 130 can consider a variety of factors to link comprehensive, consistent, and repeatable classification decisions. In particular, the word model 130 can generate a tree structure with decision nodes corresponding to attributes. The tree structure can be a non-parametric supervised learning method used for classification and regression. The system 104, the GUI 102, or an enterprise provider device can specify the attributes. The attributes can be based on documents number; classification such as quantitative or qualitative; model assessment score; lines of business; assessment rank; documents uses such as for Basel Committee on Bank Supervision (BASEL) (sets out the minimum capital requirements of financial institutions with the goal of minimizing credit risk), Comprehensive Capital Analysis and Review (CCAR) (regulatory framework to assess, regulate, and supervise large banks and financial institutions), Current Expected Credit Losses (CECL) (credit loss accounting standard); or documents findings such as of MRF. The decision tree can make a sequential hierarchical document prioritization decision based on all these documents and inputs. The decision tree can be hierarchical because the system 104 can define a series of questions that lead to a classification or label. Therefore, once the system 104 establishes labeled machine-readable documents 138, the system 104 can provide a rule-based approach in a series of if-then-else conditions that produce a prioritization of documents.

The word model 130 can use a splitting criterion (i.e. Information Gain, Gain Ratio, Gini Index, etc.) to select an attribute for producing the pure node regarding to a target variable such as an audit parameter. The word model 130 can then create a root split node with consequents subsets, then continue using splitting criteria for each subset to split data into subsets by reusing splitting criteria to select the next best attribute to produce the purest sub-nodes regarding to the target variable. The word model 130 can continue creating root split nodes until rules associated with the root split nodes can no longer be generated, such as responsive to satisfying a stopping criterion such as a purity of the node, a pre-specified limit, a depth of the node or a pre-specified limit or predictor values. The word model 130 can prune the nodes to avoid overfitting by using a criterion to determine an optimum tree size. To evaluate whether pruning or further branching a given node produces an improvement, the word model 130 can cross validate datasets by separating datasets into "training sets" or "validation sets".

The word model 130 can use the selected set of documents for review in the training audit to rank order importance of the selected documents based on audit objective. For instance, the word model 130 can use Term Frequency Inverse Document Frequency (TF-IDF) techniques figuring out what terms are most relevant for a particular document. Term frequency (TF) can represent how often a particular word appears within a document; a word that occurs frequently is probably is important to that document's meaning (i.e., frequency tends to be positively correlated to significance or relevance). Document frequency can represent how often a word occurs in an entire set of documents or the machine-readable documents database 128, such as including but not limited to documents, templates, policies, and whitepapers. The word model 130 can assess a relevancy of a word to a document based on Term Frequency/Document frequency or Term frequency multiplied by an Inverse Document Frequency (TF-IDF). The word model 130 can thus determine how often a word appears in a document over how often the word appears across a set of documents, and generate a measure of how important and unique this word is for a particular document while eliminating the most common words (based on, e.g., a set of stop words) such as "a" or "the". For instance, if a word appears often in one document but not across the set of documents, then this word can have special meaning or importance to a particular document. The word may also convey or indicate what the document is about to guide application of NLP to the document.

In some embodiments, the word model 130 can take a logarithm of the Inverse Document Frequency. In particular, the word model 130 can apply the logarithm to word frequencies distributed exponentially to indicate a weighting of the words over popularity. The word model 130 can also apply TF-IDF by parsing documents 136 or 138 into a bag of words, and then output a number, value, or hash value of each word. The word model 130 can also process documents using, for example, interest rates as an independent variable and assess how the document reacts or behaves to negative interest rate environment.

Accordingly, the word model 130 can compute a TF-IDF value for every word in a set of documents such as in the machine-readable document database 128, then for each given word or phrase, sort the documents by their TF-IDF score for that word or phrase, such as an interest rate. Therefore, the TF-IDF can rank order documents based on their TF-IDF score on word interest rate. In some embodiments, the word model 130 can rank order documents by topic or word, or employ a more complex NLP methodology such as an RNN with semantic link analysis and/or topic modeling techniques.

The embedding layer 304 can map each word of the machine-readable documents 136 or the labeled machine-readable documents 138. The embedding layer 304 can perform the mapping based on an audit parameter such as an audit word 114 associated with the machine-readable documents 136 or the labeled machine-readable documents 138. In particular, the embedding layer 304 can receive the audit word 114, and words 302d-302f of the labeled machine encoded documents 138. The embedding layer 304 can generate a plurality of training feature vectors 306 for each word 302 in the machine-readable documents 136 or the labeled machine-readable documents 138. In particular, the embedding layer 304 may generate training feature vectors 306 by mapping the words 302d-302f of the labeled machine encoded documents 138 based on the audit word 114. The training feature vectors 306 can be a numeric representation of the words 302. The training feature vectors 306 can be a numeric presentation of the words 302 in a high dimensional space.

The classifier layer 308 can receive or analyze feature vectors from the embedding layer 304. For instance, the classifier layer 308 can receive the training feature vectors 306. The classifier layer 308 can generate, from the feature vectors from the embedding layer 304, a similarity score 310 for each word in the machine-readable documents 136 or the labeled machine-readable documents 138. Each similarity score 310 can indicate a similarity of each word with the audit word 114. In some embodiments, each similarity score 310 is based on a cosine similarity between a pair of the plurality of training feature vectors 306. In some embodiments, the word model 130 can refine the training feature vectors 306 based on the similarity scores 310.

The word model 130 can train the embedding layer 304 and the classifier layer 308 on the labeled machine-readable documents 138. Once trained, the word model 130 can generate word feature vectors 312 for words 302a-302c in the machine-readable documents 136. The trained word model 130 can generate the word feature vectors 312 based on additional audit words 114 or audit parameters from the audit parameter uploader 112. In some embodiments, the trained word model 130 can select a predetermined audit word from a plurality of audit words 114 in the audit parameter uploader 112. For instance, the system 104 can receive a plurality of audit words 114 from the GUI 102, and the word model 130 can select an optimal audit word based on previous uses of the word model 130. In some embodiments, the trained word model 130 can select the predetermined audit word by selecting a first attribute based on an information gain, gain ratio, or Gini index. In some embodiments, the trained word model 130 can select the predetermined audit word by a second attribute associated with the first attribute and based on the information gain, the gain ratio, or the Gini index. In some embodiments, the trained word model 130 can select the predetermined audit word based on the second attribute and responsive to the second attribute satisfying a predetermined purity threshold. The purity threshold can correspond to measures of homogeneity of the labels at a particular node corresponding to the audit word 114 in a decision tree for selecting the predetermined audit word. In some embodiments, the word feature vectors 312 are connected as n-grams (e.g., bi-grams or tri-grams). In some embodiments, the word model 130 can determine a frequency of each word in a particular document or set of documents, and transmit the frequency to the GUI manager 124 for presentation to a user. The word model 130 can also transmit the word feature vectors 312 to the document model 132.

Figure 4:
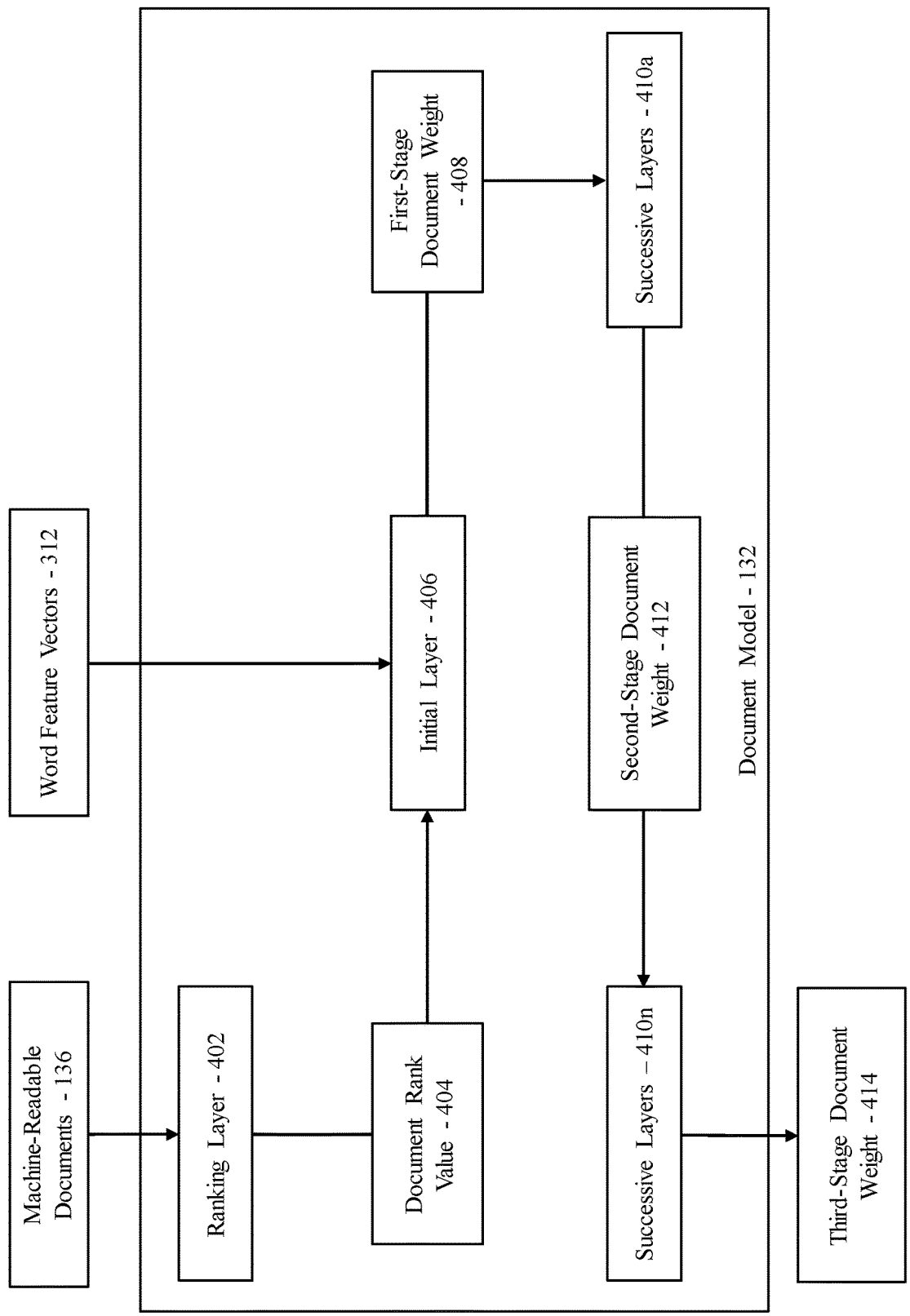
FIG. 4 is a block diagram of a document model in the system for natural language processing and text analytics of audit documentation for prioritization and selection, according to various potential embodiments.

Now referring to FIG. 4, depicted is a block diagram of the document model 132 in the system 104 for natural language processing and text analytics of audit documentation for prioritization and selection. The document model 132 can determine document weights of machine-readable documents 136. In some embodiments, the document model 132 outputs a score to rank order the machine-readable documents 136. In some embodiments, the document model 132 can produce document weights based on the section headers, document headers, users, titles, and/or timestamps of the machine-readable documents 136.

The document model 132 can include a ranking layer 402 configured to determine or obtain a document rank value 404 for each of the plurality of machine-readable documents 136. For instance, the ranking layer 402 can determine, identify, and the rank documents that are relevant or important to an audit. The ranking layer 402 can include a link analysis algorithm that assigns values or weights to each document of the machine-readable documents 136. The ranking layer 402 can thus measure a relative importance of each document of the machine-readable documents 136. The document rank value 404 can be in numeric or vector form. The document rank value 404 can be based on a number of semantic links between pairs of the plurality of machine-readable documents 136. In particular, relevant or important documents tend to be referenced by other documents, which thus indicate that a particular document is important. In some embodiments, the document rank value 404 is based on the number and type of semantic links between pairs of the plurality of machine-readable documents. The type of semantic link can correspond to the labels assigned to the labeled machine-readable documents 138. The ranking layer 402 can forward the document rank values 404 from the ranking layer 402 to an initial layer 406.

The document model 132 can include the initial layer 406 configured to assign document weights to each machine-readable document 136. The initial layer 406 can receive word feature vectors 312 from the word model 130. The initial layer 406 can receive document rank values 404 from the ranking layer 402. Based on the word feature vectors 312 and the document rank values 404, the initial layer 406 can assign a first-stage document weight 408 to each machine-readable document 136. The first-stage document weight 408 can be in numeric or vector form. In some embodiments, the first-stage document weight 408 is based on a total number of the plurality of documents 110, a predetermined audit score associated with the audit request or audit word 114, or a matter requires attention (MRA) flag. In particular, the document model 132 can modify the first-stage document weight 408 based on audit parameters such as author or term. For instance, the document model 132 can increase the first-stage document weight 408 for documents by a certain author, such as a CEO of a company, or with certain headers, such as "SEC" or "IRS". The initial layer 406 can transmit the first-stage document weight 408 to one or more successive layers 410a-410n.

The document model 132 can include the one or more successive layers 410a-410n configured to assign additional document weights to each machine-readable document 136. In some embodiments, the successive layers 410a-410n includes a recurrent neural network, XGBoost, a support vector machine, and/or a convolution neural network. In particular, the document model 132 can create an artificial neural network where connections between each feature vector forms a directed graph to allow the successive layers 410a-410n to exhibit temporal dynamic behavior. For instance, the one or more successive layers 410a-410n can be a connected neural network that contains a refactoring of each successive layers 410 into a loop. That loop can be an iteration over the addition or concatenation of two inputs, a matrix multiplication, or a non-linear function. Therefore, the one or more successive layers 410a-410n can analyze sequences of word feature vectors 312 in the machine-readable documents 136 rather than just individual word feature vectors 312. Accordingly, the successive layers 410a-410n can be suitable for text classification and take into account the sequence of word orders within phrases of a particular machine-readable document 136.

To obtain information from both past and future states simultaneously, the successive layers 410a-410n can be bidirectional by connecting two successive layers 410 in opposite directions to the same output. In particular, the successive layers 410 can include Hierarchical Attention Networks (HAN). The HAN can include bidirectional successive layers 410 and an attention mechanism. The successive layers 410 can utilize the HAN to derive meanings of sentences from word feature vectors 312, and then derive meanings of machine-readable documents 136 from sentences. Since not all words and sentences are equally important or relevant (some words characterize a sentence more than other words and some sentences characterize a text more than other sentences), the successive layers 410 can include the attention mechanism applied in HAN so that important words and sentences can get more attention from the document model 132.

The one or more successive layers 410a-410n can use internal state memory to process sequences of word feature vectors 312. Therefore, the successive layers 410 can keep track of arbitrary long-term dependencies in the input sequences of word feature vectors 312. If the successive layers 410 use back-propagation to include back-propagated gradients that tend to zero, then gradients tending to zero may cause the gradients to disappear, prevent the long-term dependencies from changing, and interfere with training of the successive layers 410. This gradient vanishing may cause the successive layers 410 to forget information. Therefore, the successive layers 410 can include Long Short-Term Memory (LSTM) and Gated Recurrent Units (GRU), which include 'memory cells' that can maintain information in memory. The successive layers 410 can then use the Gated Recurrent Units (GRU) to control when information enters the memory, when the information is output, and when the information is removed from memory. Accordingly, the successive layers 410 can include architecture for learning longer-term dependencies.

A first successive layer 410a can receive the first-stage document weight 408 and a first feature vector of the word feature vectors 312, and output a second stage document weight 412. The second-stage document weight 412 can be in numeric or vector form. Each successive layer 410 can receive the second-stage document weight 412 from the previous successive layer 410 and a successive feature vector of the word feature vectors 312, and output a revised second-stage document weight 412. Each subsequent word feature vector 312 can correspond to each subsequent word 302 within a particular machine-readable document 136 that includes the corresponding first-stage document weight 408. Each successive layer 410 can then revise the second stage document weight 412 until the last successive layer 410, such as successive layer 410n, outputs a third stage document weight 414. The third-stage document weight 414 can be in numeric or vector form. The third-stage document weight 414 can correspond to a weight for a particular machine-readable document 136 based on all of the words 302 (and corresponding word feature vectors 312) of the particular machine-readable document 136. Accordingly, the document model 132 can analyze the word feature vectors of each word 302 in each machine-readable document 136 and their corresponding document rank values 404 to assign a third-stage document weight 414 to each machine-readable document. The document model 132 can transmit or forward the third-stage document weight 414 to the score generator 134.

Figure 5:
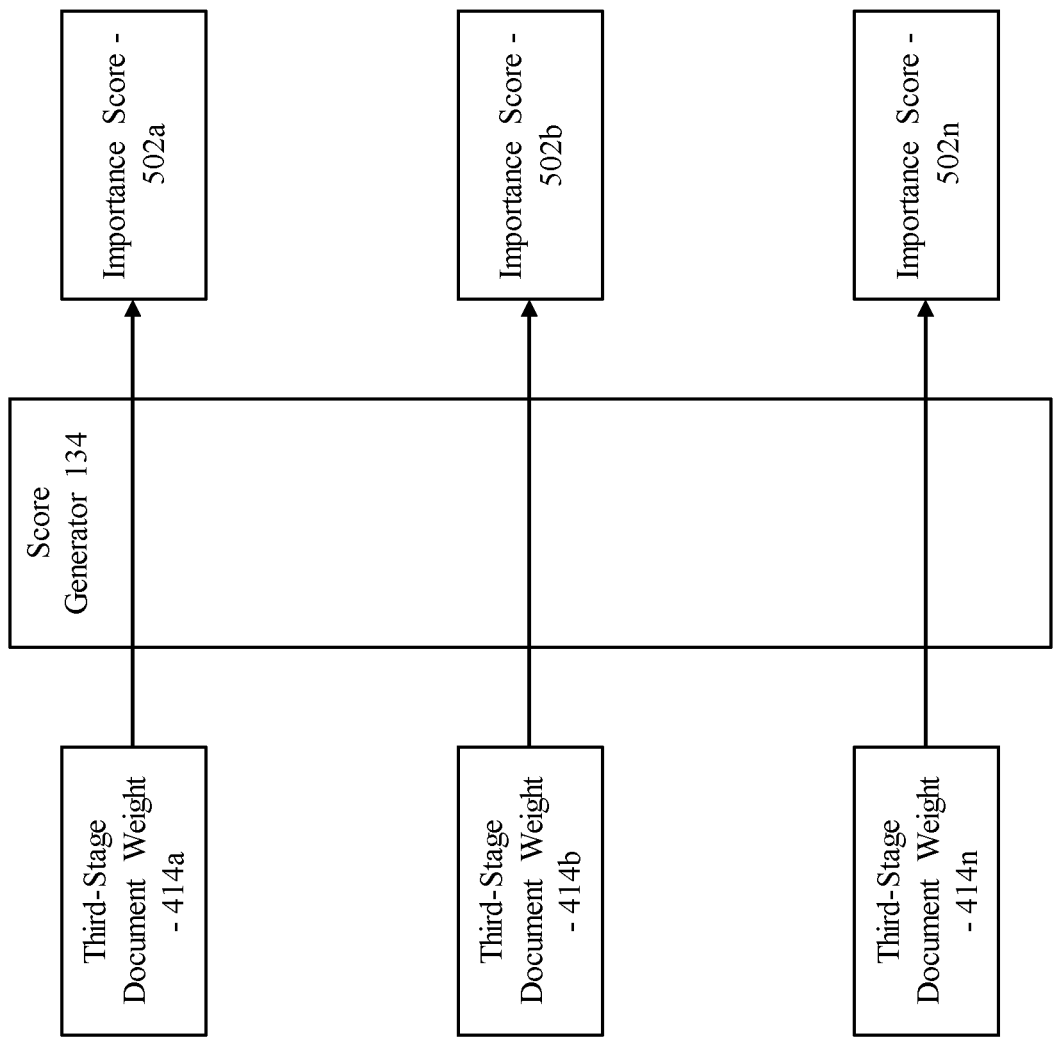
FIG. 5 is a block diagram of a score generator for determining document importance in the system for natural language processing and text analytics of audit documentation for prioritization and selection, according to various potential embodiments.

Now referring to FIG. 5, the score generator 134 can calculate, determine, or obtain importance scores 502a-502n for each of the machine-readable documents 136. The score generator 134 can receive the third-stage document weights 414a-414n of each of the machine-readable documents 136. The third-stage document weights 414 can indicate a relevance of a particular machine-readable document 136 to a particular audit word 114 or audit parameter. The score generator 134 can determine, based on the third-stage document weights 414 and the audit requests, the importance scores 502 indicating the audit likelihood for each of the machine-readable documents 136. The importance score 502 can be in numeric, binary, or visual form. In some embodiments, the score generator 134 can assign a review tag to machine-readable documents 136 responsive to the importance score 502 satisfying a predetermined review threshold. The audit parameters uploader 112 can upload the predetermined review threshold associated with the audit request. The review tag can indicate that the particular machine-readable document 136 needs review in the GUI 102 or by any other authorized party. In some embodiments, the score generator 134 can assign the importance score 502 or review tag to a respective document 110 corresponding to a respective machine-readable document 136 from which the third-stage document weight 414 and importance score 502 was calculated. In some embodiments, the score generator 134 can modify the importance score 502 of a document based on the section headers, document headers, users, titles, and/or timestamps associated with the document. In some embodiments, the score generator 134 can modify the importance score 502 based on audit parameters such as an amount of review resources available for a particular audit request, such as a team of 5 people or 10 people. In some embodiments, the score generator 134 can assign an importance score to an entity relating to the documents. For instance, the score generator 134 can assign an importance score indicating that a business entity or bank should be reviewed or audited. The score generator 134 can transmit or forward the importance scores 502 or the review tags to the network interface 120, I/O interface 122, or the GUI manager 124 for presentation to the GUI 102 or other authorized parties.

Figure 6:
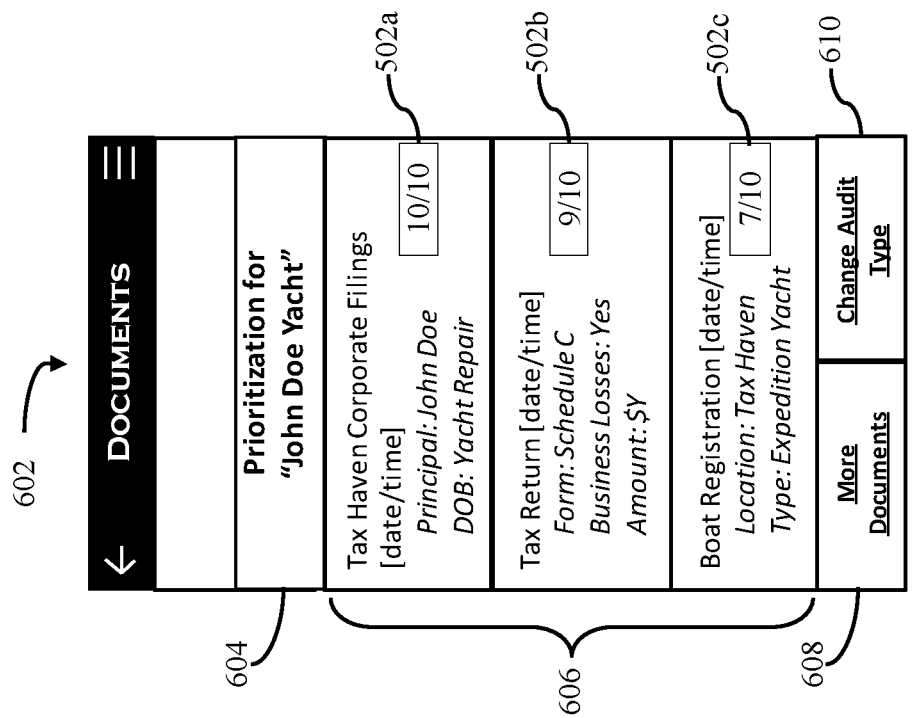
FIG. 6 provides an example view in an example audit portal for selection of prioritized documents, according to various potential embodiments.

Now referring to FIG. 6, depicted is a document view 602 in an example audit portal for viewing and selection of prioritized documents 110, according to various potential embodiments. The GUI manager 124 can present the document view 602 responsive to the audit request 208 in the audit view 202. The document view 602 can display the documents 110 or the machine-readable documents 136 after analysis of the documents 110 or the machine-readable documents 136 by the system 104. The GUI manager 124 can present the audit request 604 depicting the audit parameters or audit word(s) 114 based on which the documents were analyzed and prioritized for review. The GUI manager 124 can present a document list 606 of the documents 110 or the machine-readable documents 136. Each document in the document list 606 can be selected for review. The GUI manager 124 can present the documents in the document list 606 by their importance score 502. Responsive to receiving a selection of a document in the document list, the GUI manager 124 can display either the original document 110 or a corresponding machine-readable document 136. Each listed document can include a respective importance score 502a-502c. In the embodiment presented in FIG. 6, the importance score 502 indicates a relevance of the document on a numerical scale from 0 to 10 with 10 being most relevant. It is contemplated that the GUI manager 124 can present any other depiction of the importance score 502 such as a review tag indicating "urgent review" or any other message. The document view 602 can also include a "more documents" selection 608. The GUI manager 124 can detect the "more documents" selection 608 and show additional documents in the document list 606. The document view 602 can also include a "change audit type" selection 610. The GUI manager 124 can detect the "change audit type" selection 610 to return to the audit view 202 to modify the audit request such as an associated audit word 114.

Figure 7:
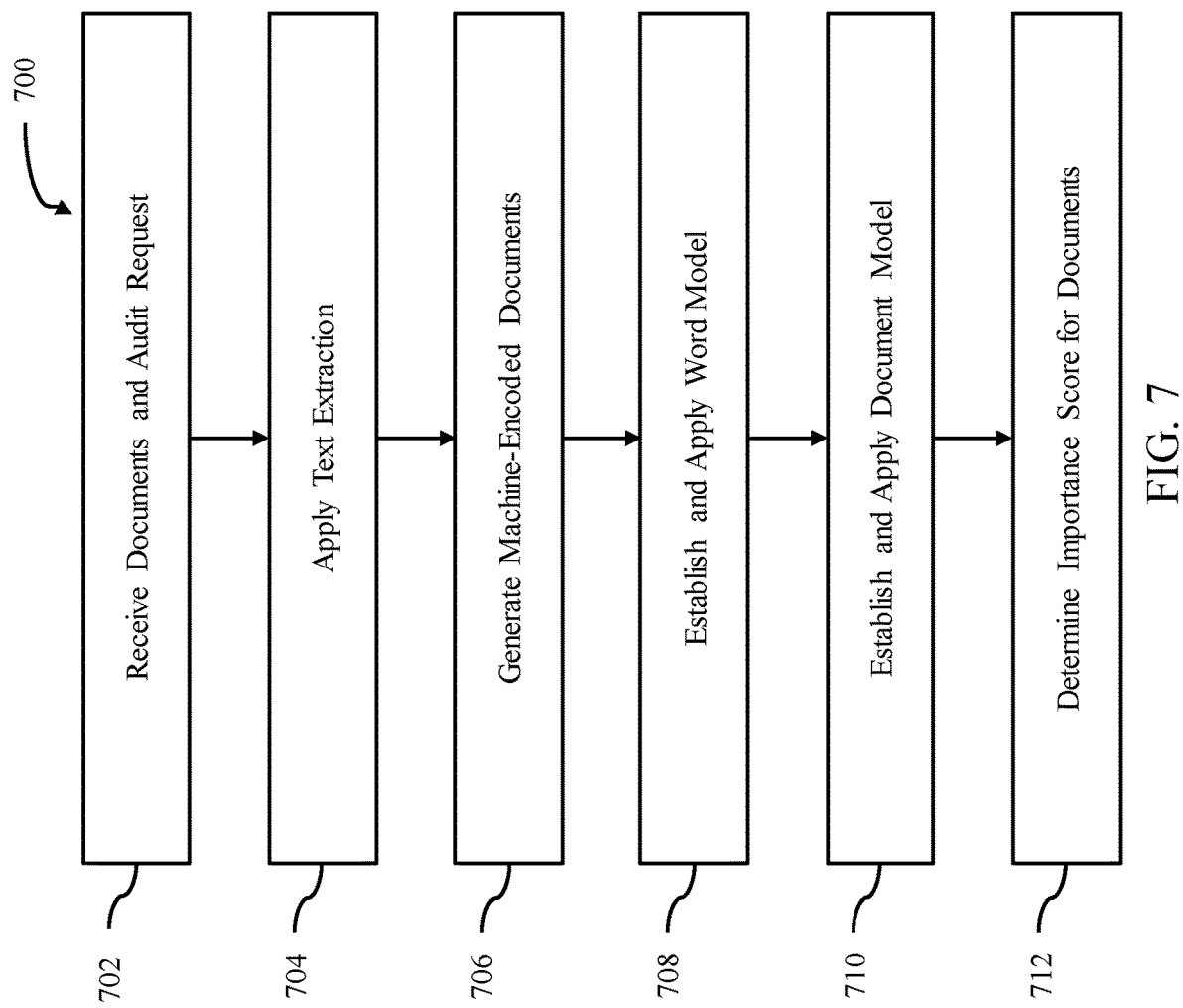
FIG. 7 is a flow diagram of an example method for natural language processing and text analytics of audit documentation for prioritization and selection, according to various potential embodiments.

FIG. 7 is a flow diagram of a method 700 for natural language processing and text analytics of audit documentation for prioritization and selection, according to various potential embodiments. The method can be a computer-implemented method for natural language processing and text analytics of audit documentation for prioritization and selection of documents. Method 700 may be implemented using the prioritization and selection system 104 of FIG. 1, and particularly, by the processor 116. As such, reference will be made to the system 104 when describing method 700. In another embodiment, at least portions of method 700 may be performed via or by the GUI 102. In another embodiment, additional, fewer, and/or different operations may be performed. It will be appreciated that the order or flow of operations indicated by the flow diagrams and arrows with respect to the methods described herein is not meant to be limiting. For example, in one embodiment, two or more of the operations of method 700 may be performed simultaneously.

At operation 702, the system 104 receives documents 110 corresponding to an audit request. The audit generator 106 can transmit the audit request to the system 104. The documents 110 can be from the files uploader 106. The documents 110 can include a first set of one or more documents of a first file type and a second set of one or more documents of a second file type. In some embodiments, the documents 110 are images or word processing documents. In some embodiments, the documents 110 include a set of model documents, templates, policies, whitepapers, model develop documents (MDD), model validation reports (MVD), or performance reports. The audit request can include an audit word 114 from the audit parameter uploader 112. In some embodiments, the audit word 114 is based on the audit request. In some embodiments, the audit generator 106 can select the audit word 114. The audit generator 106 processors can select the audit word 114 by selecting a first attribute based on an information gain, gain ratio, or Gini index. The audit generator 106 can select the audit word 114 by a second attribute associated with the first attribute and based on the information gain, the gain ratio, or the Gini index. The audit generator 106 can select the audit word 114 based on the second attribute and responsive to the second attribute satisfying a predetermined purity threshold. A user or entity can request the audit request, upload documents 110, and input or select audit words 114 via the GUI 102. In particular, the GUI manager 124 can present the audit view 202 in the GUI 102 to receive the audit requests and documents 110. In some embodiments, the system 104 can receive the documents 110 corresponding to an audit request from a first provider device. The system 104 can receive, via an API, the audit word 114 from a second provider device of, for example, a government entity or regulator. The I/O interface 122 can define the API for the receipt of the audit requests, documents 110, or audit words 114. The I/O interface 122 can define the interactions between the system 104 and the GUI 102. The I/O interface 122 can use the API to define calls or requests that the GUI 102 can make transmitting documents 110, the audit words 114, or the audit generator 106. The I/O interface 122 can also provide extension mechanisms for additional user devices or provider devices to contact the system 104. The I/O interface 122 can also customize the API for each provider device or user device. For example, the I/O interface 122 can define an API for a provider device to transmit documents 110 to the system 104, or define another API for a user device to transmit documents 110 and audit words 114 to the system 104.

At operation 704, the system 104 can apply a plurality of text extraction and conversion techniques to the documents 110. In particular, the extractor 126 can apply the text extraction and conversion techniques. If the documents 110 are word processing documents, then the extractor 126 can apply text extraction and conversion techniques such as pip install python-docx getText. If the documents 110 are images, then the extractor 126 can apply text extraction and conversion techniques such as pyPdf, textract, or natural language toolkit. In some embodiments, the extractor 126 applies the plurality of text extraction and conversion techniques to extract section headers, document headers, users, titles, and/or timestamps from the plurality of documents 110.

At operation 706, the system 104 can generate machine-readable documents 136 or labeled machine-readable documents 138. In particular, the extractor 126 can generate the machine-readable documents 136 or labeled machine-readable documents 138 based on the plurality of text extraction and conversion techniques. The labeled machine-readable documents 138 can include labels. Each label can be associated with at least one of a plurality of classifications corresponding to the audit request. In some embodiments, labeled machine-readable documents 138 can be a subset of the machine-readable documents 136. At operation 708, the system 104 can establish and apply the word model 130. In some embodiments, the word model 130 is a natural language processing algorithm. The word model 130 can produce word embeddings to reconstruct linguistic contexts of words in the machine-readable documents. In particular, system 104 can establish or train the word model 130 from the labeled machine-readable documents 138. The word model 130 can include the embedding layer 304, which can map each word 302 of the labeled machine-readable documents 138 with a predetermined audit word. The embedding layer 304 can then generate the training feature vectors 306 for each word 302 in the labeled machine-readable documents 138. The word model 130 can also include the classifier layer 308 configured to generate, from the training feature vectors 306, the similarity scores 310 for each word 302 in the labeled machine-readable documents 138. Each similarity score 310 can indicate a similarity of each word 302 with the predetermined audit word 114. In some embodiments, the similarity score 310 is based on a cosine similarity between a pair of training feature vectors. After training the word model 130 using the labeled machine-readable documents and the predetermined audit word 114, the system 104 can apply the word model 130 to other documents and audit words 114, such as the machine-encoded documents 136 to generate the word feature vectors 312. In some embodiments, the system 104 can apply the word model 130 to the section headers, document headers, users, titles, of the machine encoded documents 136 or the labeled machine-readable documents 138. In some embodiments, the system 104 can indicate, using the word model 130, a frequency of each word 302.

At operation 710, the system 104 can apply and establish the document model 132 to determine document weights of each machine-readable document 136. In some embodiments, the document model 132 includes a recurrent neural network, XGBoost, a support vector machine, and/or a convolution neural network. In some embodiments, the document model 132 is a recurrent neural network forming a directed graph between the second pluralities of words. The document model 132 can include the ranking layer 402 configured to obtain the document rank value 404 for each of the plurality of machine-readable documents 136. The document rank value 404 can be based on a number of semantic links between pairs of the plurality of machine-readable documents 136. In some embodiments, the system 104 can apply the document model 132 to the section headers, document headers, users, titles, and/or timestamps of the machine-readable documents 136 to modify their document rank value. In some embodiments, the document rank value 404 is based on the number and type of semantic links between pairs of the plurality of machine-readable documents. The type of semantic link can correspond to the labels assigned to the subset of the plurality of machine-readable documents 136. The document model 132 can include the initial layer 406 configured to receive the word feature vectors 312 for each of the second plurality of words in the plurality of machine-readable documents 136 and their corresponding document rank values 404 to assign the first-stage document weight 408 to each machine-readable document 136. In some embodiments, the word feature vectors are connected as bi-grams or tri-grams. In some embodiments, the document model 132 can determine the first-stage document weight 408 based on a total number of the plurality of machine-readable documents 136, an audit score associated with the audit request, or a matter requires attention (MRA) flag. The document model 132 can include the one or more successive layers 410 configured to receive (i) the first-stage document weight 408 and (ii) a subsequent word feature vector 312 for each subsequent word 302 within each machine-readable document 136 and its corresponding first-stage document weight 408 to assign a second-stage document weight 412 to each machine-readable document 136. The system 104 can apply the successive layer 410 to the subsequent word feature vectors 312 of each word 302 in each machine-readable document 136 and their corresponding document rank values 404 to assign the third-stage document weight 414 to each machine-readable document 136.

At operation 712, the system 104 can determine importance scores 502 for the documents 110. In particular, the system 104 can determine the importance scores 502 based on the third-stage document weights 414 and the audit request of the machine-readable documents 136 corresponding to the documents 110. The importance scores 502 can indicate an audit likelihood for each of the plurality of machine-readable documents 136. In some embodiments, the system 104 can utilize the score generator 134 to modify the importance scores 502 based on the section headers, document headers, users, titles, of the machine encoded documents 136 or the labeled machine-readable documents 138. In some embodiments, the system 104 can present, in a graphical user interface, the plurality of documents 110 by importance score. In some embodiments, the GUI manager 124 can present the document view 602 in the GUI 102.

It is noted that any of the features, selectors, icons, functionalities, information, elements, or other aspects of any one interface or figure may be combined or swapped with or applied to any of the features, selectors, icons, functionalities, information, elements, or other aspects of any other interface or figure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor that, in some example embodiments, may execute instructions stored, or otherwise accessed, via different areas of memory). Alternatively, or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible considering the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions and arrangement of the embodiments without departing from the scope of the present disclosure as expressed in the appended claims.

What is claimed is:

1. A system comprising:
   a memory having computer-executable instructions; and
   one or more processors configured to execute instructions to cause the system to:
      receive a plurality of documents corresponding to an audit request, the plurality of documents comprising a first set of one or more documents of a first file type and a second set of one or more documents of a second file type;
      apply a plurality of text extraction and conversion techniques to the first and second sets of documents to generate a plurality of electronic documents;
      generate a dataset comprising the plurality of electronic documents and labels assigned to a subset of the plurality of electronic documents, each label associated with at least one of a plurality of classifications corresponding to the audit request;

train, based on supervised learning, using the dataset including the labels assigned to the subset of the plurality of electronic documents, a first machine-learning model to produce feature vectors comprising word embeddings from the electronic documents, the first machine-learning model configured to:

map each word of a first plurality of words in the subset based on a predetermined audit word to generate a first plurality of feature vectors; and generate, from the first plurality of feature vectors, a respective similarity score for each word in the first plurality of words in the subset, each similarity score indicating a similarity of each word with a predetermined audit word;

apply the first machine-learning model to the dataset to generate a second plurality of feature vectors for a second plurality of words in the plurality of electronic documents;

apply a second machine-learning model to determine respective document weights of each electronic document of the plurality of electronic documents, the second machine-learning model configured to:

obtain a respective document rank value for each of the plurality of electronic documents, each document rank value determined based on a number of associations between pairs of the plurality of electronic documents;

receive the second plurality of feature vectors and their corresponding document rank values to assign a respective first-stage document weight to each electronic document; and one or more successive layers configured to receive, for each electronic document (i) the respective first-stage document weight and (ii) a respective third feature vector for each word within each electronic document to assign a second-stage document weight to each electronic document based on the respective third feature vector and the respective first-stage document weight; and apply the second machine-learning model to the second plurality of feature vectors and the respective document rank values to assign a third-stage document weight to each electronic document; and determine, based on each third-stage document weight and the audit request, a respective importance score indicating an audit likelihood for each of the plurality of documents.

2. The system of claim 1, wherein the plurality of documents are images or word processing documents.

3. The system of claim 1, wherein the plurality of documents are word processing documents, and wherein the plurality of text extraction and conversion techniques include python-based extraction.

4. The system of claim 1, wherein the plurality of documents are images, and wherein the plurality of text extraction and conversion techniques include pyPdf, textract, and natural language toolkit.

5. The system of claim 1, wherein the plurality of text extraction and conversion techniques extract section headers, document headers, users, titles, and timestamps from the plurality of documents; and wherein the one or more processors are further configured to apply the first model and the second model to the section headers, the document headers, the users, the titles, and the timestamps to modify the respective importance score for each of the plurality of documents.

6. The system of claim 1, wherein the plurality of documents include a set of , templates, policies, whitepapers, or performance reports.

7. The system of claim 1, wherein the one or more processors are further configured to:

receive the plurality of documents corresponding to the audit request from a first provider device of a first entity; and receive, via an API, the predetermined audit word from a second provider device of a governmental body or regulator.

8. The system of claim 1, wherein the one or more processors are further configured to indicate, using the first model, a frequency of each word of the second plurality of word.

9. The system of claim 1, wherein the document rank value is based on the number and type of associations between pairs of the plurality of electronic documents, the type based on the labels assigned to the subset of the plurality of electronic documents.

10. The system of claim 1, wherein the first-stage document weight is based on a total number of the plurality of documents, an audit score associated with the audit request, or a matter requires attention (MRA) flag.

11. The system of claim 1, wherein the second model includes a recurrent neural network, XGBoost, a support vector machine, or a convolution neural network.

12. The system of claim 1, wherein the predetermined audit word is based on the audit request.

13. The system of claim 1, wherein the one or more processors are further configured to select the plurality of documents corresponding to the audit request by:

selecting a first attribute based on an information gain, gain ratio, or Gini index;

selecting a second attribute associated with the first attribute and based on the information gain, the gain ratio, or the Gini index; and selecting the plurality of documents based on a characteristic of the second attribute and responsive to the second attribute satisfying a predetermined purity threshold.

14. The system of claim 1, wherein the first model is a natural language processing algorithm.

15. The system of claim 1, wherein the similarity score is based on a cosine similarity between a pair of feature vectors output by the embedding layer.

16. The system of claim 1, wherein the second model is a recurrent neural network forming a directed graph between the second plurality of words.

17. The system of claim 1, wherein the second plurality of words are connected as bi-grams or tri-grams.

18. The system of claim 1, wherein the one or more processors are further configured to present, in a graphical user interface, the plurality of documents by their importance scores.

19. A computer-implemented method comprising:

receiving, by one or more processors, a plurality of documents corresponding to an audit request, the plurality of documents comprising a first set of one or more documents of a first file type and a second set of one or more documents of a second file type;

applying, by the one or more processors, a plurality of text extraction and conversion techniques to the first and second sets of documents to generate a plurality of electronic documents;

generating, by the one or more processors, a dataset comprising the plurality of electronic documents and labels assigned to a subset of the plurality of electronic documents, each label associated with at least one of a plurality of classifications corresponding to the audit request;

training, by the one or more processors, based on supervised learning, using the dataset including the labels assigned to the subset of the plurality of electronic documents, a first machine-learning model to produce feature vectors comprising word embeddings from the electronic documents, the first machine-learning model configured to:

map each word of a first plurality of words in the subset based on a predetermined audit word to generate a first plurality of feature vectors; and generate, from the first plurality of feature vectors, a respective similarity score for each word in the first plurality of words in the subset, each similarity score indicating a similarity of each word with a predetermined audit word;

applying, by the one or more processors, the first machine-learning model to the dataset to generate a second plurality of feature vectors for a second plurality of words in the plurality of electronic documents;

applying, by the one or more processors, a second machine-learning model to determine document weights of each electronic document of the plurality of electronic documents, the second machine-learning model configured to:

obtain a respective document rank value for each of the plurality of electronic documents, each document rank value determined based on a number of associations between pairs of the plurality of electronic documents;

receive the second plurality of feature vectors and their corresponding document rank values to assign a respective first-stage document weight to each electronic document; and receive, for each electronic document (i) the respective first-stage document weight and (ii) a respective third feature vector for each word within each electronic document a to assign a second-stage document weight to each electronic document based on the respective third feature vector and the respective first-stage document weight; and applying, by the one or more processors, the second machine-learning model to the second plurality of feature vectors and the respective document rank values to assign a third-stage document weight to each electronic document; and determining, by the one or more processors, based on each third-stage document weight and the audit request, a respective importance score indicating an audit likelihood for each of the plurality of documents.

20. A non-transitory computer-readable storage medium storing one or more programs that are configured to be executed by one or more processors of a computer system, the one or more programs including instructions for:

receiving a plurality of documents corresponding to an audit request, the plurality of documents comprising a first set of one or more documents of a first file type and a second set of one or more documents of a second file type;

applying a plurality of text extraction and conversion techniques to the first and second sets of documents to generate a plurality of electronic documents;

generating a dataset comprising the plurality of electronic documents and labels assigned to a subset of the plurality of electronic documents, each label associated with at least one of a plurality of classifications corresponding to the audit request;

training, based on supervised learning, using the dataset including the labels assigned to the subset of the plurality of electronic documents, a first machine-learning model to produce feature vectors comprising word embeddings from the electronic documents, the first machine-learning model configured to:

map each word of a first plurality of words in the subset based on a predetermined audit word to generate a first plurality of feature vectors; and generate, from the first plurality of feature vectors, a respective similarity score for each word in the first plurality of words in the subset, each similarity score indicating a similarity of each word with a predetermined audit word;

applying the first machine-learning model to the dataset to generate a second plurality of feature vectors for a second plurality of words in the plurality of electronic documents;

applying a second machine-learning model to determine respective document weights of each electronic document of the plurality of electronic documents, the second machine-learning model configured to:

obtain a respective document rank value for each of the plurality of electronic documents, each document rank value determined based on a number of associations between pairs of the plurality of electronic documents;

receive the second plurality of feature vectors and their corresponding document rank values to assign a respective first-stage document weight to each electronic document; and receive, for each electronic document (i) the respective first-stage document weight and (ii) a respective third feature vector for each word within each electronic document to assign a second-stage document weight to each electronic document based on the respective third feature vector and the respective first-stage document weight; and applying the second machine-learning model to the second plurality of feature vectors and the respective document rank values to assign a third-stage document weight to each electronic document; and determining, based on each third-stage document weight and the audit request, a respective importance score indicating an audit likelihood for each of the plurality of documents.

* * * * *